United States Patent
Chen et al.

(10) Patent No.: US 9,532,304 B1
(45) Date of Patent: Dec. 27, 2016

(54) METHOD FOR POST-AUTHENTICATING USER EQUIPMENT, CONTROLLER AND NETWORK SYSTEM

(71) Applicants: Industrial Technology Research Institute, Hsinchu (TW); National Chiao Tung University, Hsinchu (TW)

(72) Inventors: Jyh-Cheng Chen, Taichung (TW); Jen-Shun Yang, Hsinchu County (TW); Yi-Hao Lin, Hsinchu (TW); Shang-Chun Ou, Kaohsiung (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 0 days.

(21) Appl. No.: 14/979,565

(22) Filed: Dec. 28, 2015

(30) Foreign Application Priority Data

Jun. 24, 2015 (TW) .............................. 104120333 A (51) Int. Cl.
*H04W 4/00* (2009.01)
*H04W 48/16* (2009.01)
(Continued)

(52) U.S. Cl.
CPC .............. *H04W 48/16* (2013.01); *H04W 12/06* (2013.01); *H04W 60/04* (2013.01); *H04W 64/006* (2013.01)

(58) Field of Classification Search
USPC .................................... 455/432.1, 435–456.1
See application file for complete search history.

(56) References Cited

U.S. PATENT DOCUMENTS 8,036,191 B2 * 10/2011 Kroselberg ........... H04W 88/04
370/328
8,050,238 B2   11/2011 Harris
(Continued)

FOREIGN PATENT DOCUMENTS

CN    104247545    12/2014
TW    200516917    5/2005
(Continued)

OTHER PUBLICATIONS

Zou et al., "Design and implementation of secure multicast based on SDN," 2013 5th IEEE International Conference on Broadband Network & Multimedia Technology (IC-BNMT), Nov. 2013, pp. 124-128.
(Continued)

Primary Examiner — Fayyaz Alam
(74) Attorney, Agent, or Firm — Jianq Chyun IP Office (57) ABSTRACT

A method for post-authenticating user equipment (UE), a controller and a network system are disclosed. The method includes: determining whether an external channel quality of at least one gateway is higher than a threshold when UE connects to an access point (AP) routed by the gateway; when the external channel quality is not higher than the threshold, authenticating the UE incompletely and controlling the AP to limit a network capability providing to the UE; estimating a future channel capacity of the gateway; calculating a priority weight of each UE; selecting candidate UE from the UEs according to the future channel capacity and the priority weight of each UE; arranging an authenticating mechanism for completely authenticating the candidate UE at a timing point corresponding to the future channel capacity.

33 Claims, 4 Drawing Sheets

(51) Int. Cl.
*H04W 12/06* (2009.01)
*H04W 64/00* (2009.01)
*H04W 60/04* (2009.01)

(56) References Cited

U.S. PATENT DOCUMENTS

| | | | |
|---|---|---|---|
| 8,442,551 B2* | 5/2013 | Liu | H04W 12/06 455/411 |
| 8,806,573 B2 | 8/2014 | Mahamuni et al. | |
| 2004/0185876 A1 | 9/2004 | Groenendaal et al. | |
| 2006/0236105 A1 | 10/2006 | Brok et al. | |
| 2008/0076393 A1 | 3/2008 | Khetawat et al. | |
| 2009/0028169 A1 | 1/2009 | Bear et al. | |
| 2010/0107225 A1* | 4/2010 | Spencer | H04L 63/0876 726/4 |
| 2011/0194532 A1* | 8/2011 | Kakkad | H04W 36/30 370/331 |
| 2012/0214491 A1* | 8/2012 | Murakawa | H04W 12/06 455/436 |
| 2013/0042301 A1 | 2/2013 | Mahamuni et al. | |
| 2014/0301192 A1 | 10/2014 | Lee et al. | |

FOREIGN PATENT DOCUMENTS

| | | |
|---|---|---|
| TW | 201316815 | 4/2013 |
| TW | I429220 | 3/2014 |

OTHER PUBLICATIONS

Open Network Foundation, "OpenFlow Switch Specification Version 1.3.0 (Wire Protocol 0x04)," Jun. 2012, pp. 1-106.

Naous et al., "NetFPGA: Reusable Router Architecture for Experimental Research," Proceedings of the ACM workshop on Programmable routers for extensible services of tomorrow, Aug. 2008, pp. 1-7.

Gude et al., "NOX: Towards an Operating System for Networks," ACM SIGCOMM Computer Communication Review, Jul. 2008, pp. 105-110.

Naous et al., "Implementing an OpenFlow Switch on the NetFPGA platform," Proceedings of the 4th ACM/IEEE Symposium on Architectures for Networking and Communications Systems, Nov. 2008, pp. 1-9.

Wang et al., "Dynamic Load Balancing and Throughput Optimization in 3GPP LTE Networks," Proceedings of the 6th International Wireless Communications and Mobile Computing Conference, Jun. 2010, pp. 939-943.

Li et al., "Joint Optimization on Load Balancing and Network Load in 3GPP LTE Multi-cell Networks," 2011 International Conference on Wireless Communications and Signal Processing (WCSP), Nov. 2011, pp. 1-5.

McKeown et al., "OpenFlow: Enabling Innovation in Campus Networks," ACM SIGCOMM Computer communication Review, Mar. 2008, pp. 69-74.

Sherwood et al., "FlowVisor: A Network Virtualization Layer," OpenFlow, Oct. 2009, pp. 1-14.

S. Haykin, "Nonlinear Methods of Spectral Analysis 2nd ed.," Mar. 1983, pp. 1-11, Springer-Verlag.

Long et al, "A Real-time Algorithm for Long Range Signal Strength Prediction in Wireless Networks," IEEE Wireless Communications and Networking Conference, Mar. 2008, pp. 1120-1125.

Roth et al., "Frequency Warped Burg's Method for AR-Modeling ," 2003 IEEE Workshop on Applications of Signal Processing to Audio and Acoustics, Oct. 2003, pp. 5-8.

Office Action of Taiwan Counterpart Application, issued on Sep. 22, 2016, p.1-p.4.

* cited by examiner

METHOD FOR POST-AUTHENTICATING USER EQUIPMENT, CONTROLLER AND NETWORK SYSTEM

CROSS-REFERENCE TO RELATED APPLICATION

This application claims the priority benefits of Taiwan application serial no. 104120333, filed on Jun. 24, 2015. The entirety of the above-mentioned patent application is hereby incorporated by reference herein and made a part of this specification.

TECHNICAL FIELD

The present application relates to a method for post-authenticating at least one user equipment (UE), a controller and a network system thereof.

BACKGROUND

High-Speed Rail is one of important transportation tools in many countries, such as TVG in France, ICE (Inter-City Express) in German, Shinkansen in Japan, and Taiwan High Speed Rail. With the development of the high-speed rail and the popularity of the communication equipment, the demands of the network are rapidly increasing in fast moving scenarios. In general, a highest speed of a train in the High-Speed Rail is approximate to 280 kilometers per hour. Under such a high moving speed, the variation of the signal quality within a short time would be quite large. And, influenced by the Doppler Effects, the decoding error rate at the receiving side would increase. This makes the User Equipment (UE) frequently try to resend data when the network connection is interrupted. Generally, before an UE to access the Internet, the UE must accept an authentication, such as authenticated by an authentication authorization accounting (AAA) server. However, if an authentication process to authenticate the UE failed due to the network disconnection, the UE would continuously try to resend the authentication data to complete the authentication process.

Figure 1:
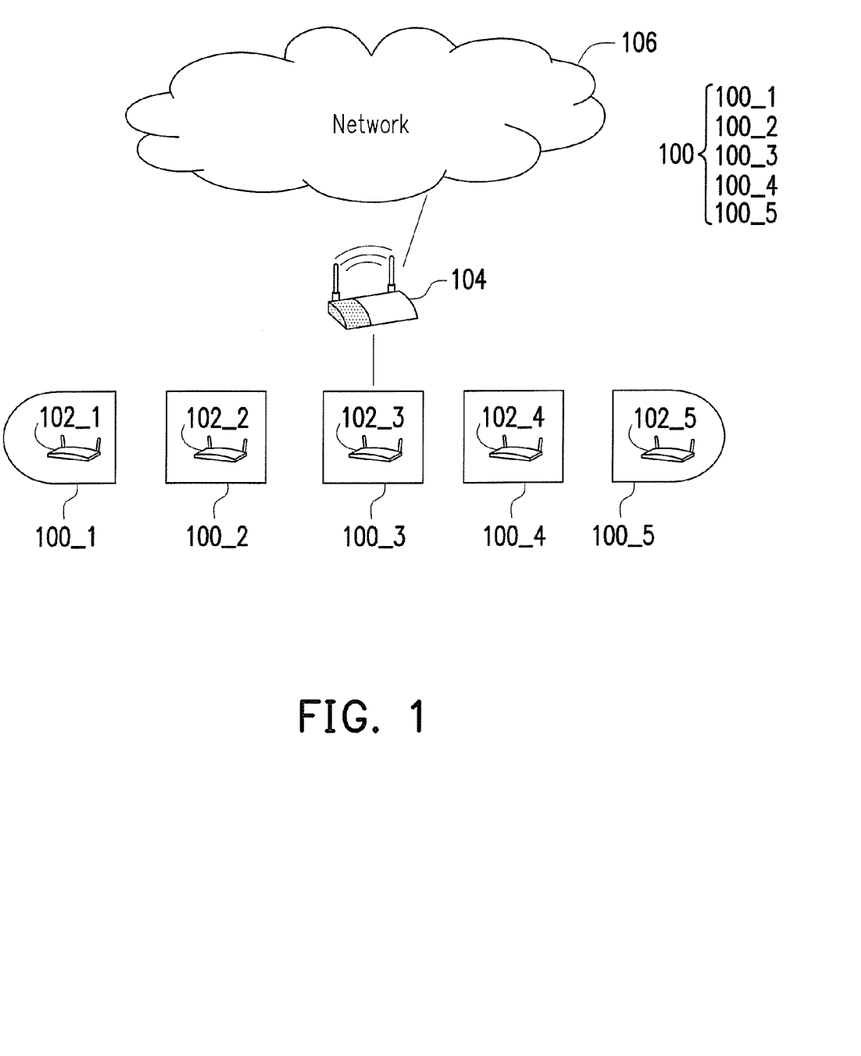
FIG. 1 is a block diagram illustrating a network system of a train.

FIG. 1 is a block diagram illustrating a network system of a train 100. The train 100 in FIG. 1 could be a train, a High-Speed Rail, or other transportation with a predictable traveling route and multi-cars. The rain 100 may include five cars 100_1~100_5. In this embodiment, the access points (APs) 102_1~102_5 could be disposed respectively to cars 100_1~100_5 in the train, and could respectively provide the passengers in cars 100_1~100_5 with network access capabilities. For example, the access point 102_1 could provide the passengers in 100_1 car to access the network with mobile devices (such as mobile phones, tablet PCs, notebook computers or other similar devices), and access point 102_2 could provide the passengers in car 100_2 network access, and the remaining access points 102_3~102_5 likewise.

As shown in FIG. 1, the train 100 disposed only a single External Gateway 104 (for example, a client device (Customer Premise Equipment, CPE) gateway) connected to the car 100_3. Gateway 104 could be connected to APs 102_1~102_5, and as an intermediate access point to communicate with the network 106 between cars 102_1~102_5. Network 106 could be, but not limited to long-range evolution (LTE), WiMAX (worldwide interoperability for microwave access, WiMAX), third generation mobile communication networks (3Gs), the fourth generation of mobile communication networks (4Gs) or other similar networks.

Although FIG. 1 is not explicitly depicted the configuration of network 106, but it is substantially based on communication standards and could be configured to include corresponding network entities. For example, if using the LTE network to communicate 106 and the gateway 104, network 106 may include an enhanced node B (eNB), a mobility management entity (MME), serving gateway (S-GW), and packet data network gateways (P-GW) and other network entities, but not limited thereto.

Since the train 100 has only a single External Gateway 104, so that the channel quality between the gateways 104 and the network 106 would be changed rapidly when the train 100 was moving, and the situation of network disconnection would occur often. When the authentication process of UE failed, the transmission queue of the external gateway would be filled with the authentication data, and it could cause network congestion.

In addition, even if an additional redundant Gateway was built in car 100_3 like gateway 104 to shunt the traffic of gateway 104, the overall transmission efficiency still could not reach the channel diverse effect because the channel quality of the redundant gateway is similar to that of the gateway 104.

In the network topology built by the well-known train, there is only one single configuration of an external (outbound) gateway. As previously mentioned, when the authentication process of an UE failed, the transmission queue of the external gateway will would be filled with the authentication data, and the phenomenon of network congestion could occurs.

SUMMARY

The embodiments of the disclosure may provide a method for post-authenticating the at least one user equipment, a controller, and a network system thereof.

An embodiment of the disclosure relates to a method for post-authenticating at least one user equipment, adapted to a controller connected to at least one gateway. The method comprises: the at least one user equipment is connected to at least an access point, determining whether an external channel quality of the at least one gateway is higher than a threshold; wherein the external channel quality is not higher than the threshold; incompletely authenticating the at least one user equipment, and controlling the at least one access point to provide the at least one user equipment with a limited network access ability, and the external channel quality is not higher than the threshold; estimating a future channel capacity of the at least one gateway; calculating a priority weight of each user equipment of the at least one user equipment according to the user equipment's an authentication waiting time, a number of authentication failures and at least one hop count between the at least one access point and the at least one gateways; and selecting at least one candidate user equipment from the at least one user equipment based on a the future channel capacity and the priority weight of the at least one candidate user equipment, and arranging a corresponding authentication mechanism for completely authenticating the at least one candidate user equipment at a time corresponding to the future channel capacity.

Another embodiment of the disclosure relates to a controller. The controller comprises a storage unit storing multiple modules; and a processing unit connected to the storage unit, accessing and executing the-multiple modules. The multiple modules include a determining module, a controlling module, an estimating module, a calculating module, and a selecting module. The determining module determines whether an external channel quality of at least one gateway is higher than a threshold, wherein at least one user equipment is connected to at least one access point through the at least one gateway. The controlling module incompletely authenticates the at least one user equipment, and controls the at least one access point to provide the at least one user equipment with a limited network access ability, wherein the external channel quality is not higher than the threshold. The estimating module estimates a future channel capacity of the at least one gateway. The calculating module calculates a priority weight of each user equipment of the at least one user equipment according to the user equipment's an authentication waiting time, a number of authentication failures and at least one hop count between the at least one access point and the at least one gateway. The selecting module; selects at least one candidate user equipment from the at least one user equipment based on a the future channel capacity and the priority weight of the at least one candidate user equipment, and arranges a corresponding authentication mechanism for completely authenticating the at least one candidate user equipment at a time corresponding to the future channel capacity.

Yet another embodiment of the disclosure relates to a network system. The network system comprises at least one gateway, at least one access point connected to the at least one gateway to access a network, and a controller connected to the at least one gateway and the at least one access point, wherein at least one user equipment is connected to the at least one access point through the at least one gateway. The controller further determines whether an external channel quality of the at least one gateway is higher than a threshold; incompletely authenticates the at least one user equipment, and controls the at least one access point to provide the at least one user equipment with a limited network access ability, wherein the external channel quality is not higher than the threshold; estimates a future channel capacity of the at least one gateway; calculates a priority weight of each user equipment of the at least one user equipment according to the user equipment's an authentication waiting time, a number of authentication failures and at least one hop count between the at least one access point and the at least one gateway; and selects at least one candidate user equipment from the at least one user equipment based on a the future channel capacity and the priority weight of the at least one candidate user equipment, and arranges a corresponding authentication mechanism for completely authenticating the at least one candidate user equipment at a time corresponding to the future channel capacity.

The foregoing will become better understood from a careful reading of a detailed description provided herein below with appropriate reference to the accompanying drawings.

DETAILED DESCRIPTION OF THE EMBODIMENTS

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

According to an embodiment, the disclosure provides a method for post-authenticating at least one UEs. In the embodiment, while the channel quality of the at least one gateway is poor, at least one access point may provide limited network access capabilities (such as limited bandwidth, flow and time, etc.) to the at least one UE incompletely authenticated such as an authentication process has not been finished yet. Further, the method may arrange a mechanism to select at least one candidate UE having a higher priority weight to be authenticated from the at least one UE, and then allows the at least one candidate UE to complete the authentication process at a proper time. The detailed will be described in the following. In an exemplary embodiment, a channel quality may be but not limited to characterized as a reference signal received power (RSRP), a carrier to interference noise ratio (CINR), a carrier noise ratio (carrier to noise ratio, CNR), a signal to noise ratio (SNR) and/or a signal to interference noise ratio (SINR), but is not limited thereto.

Figure 2:
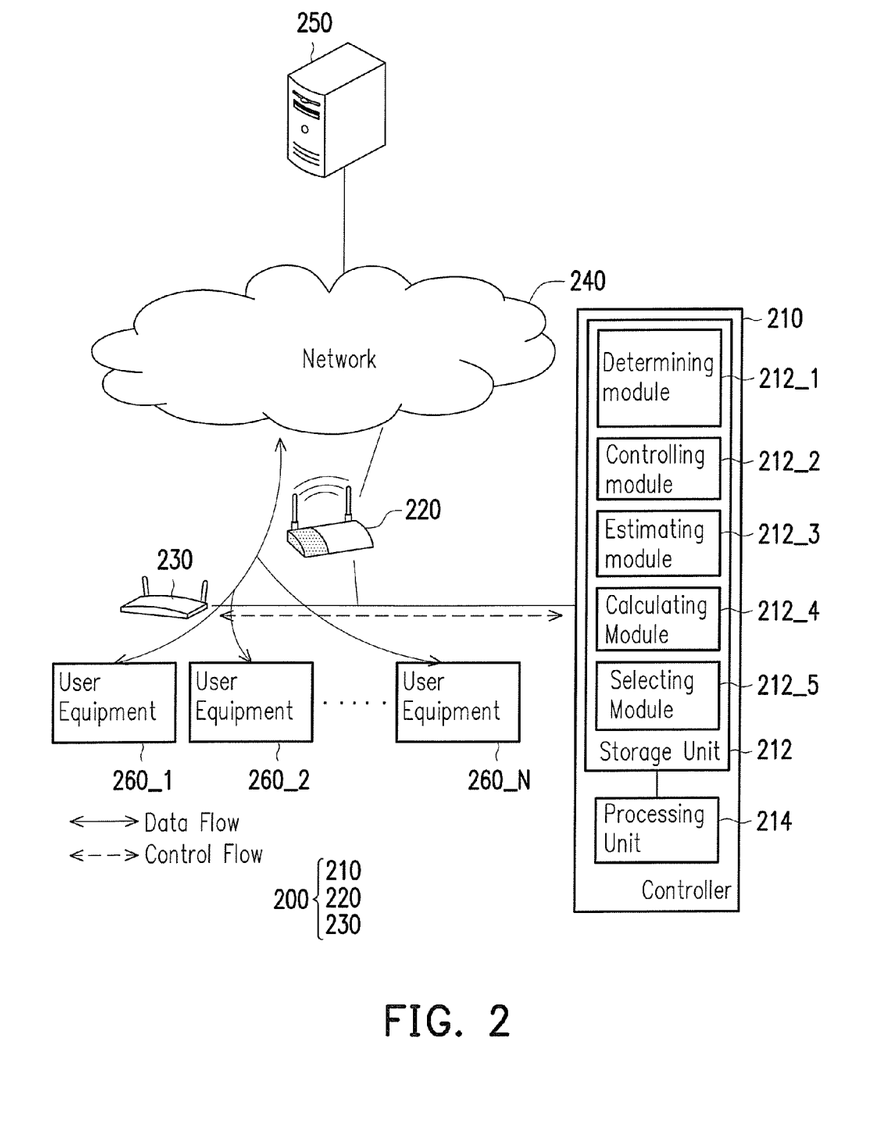
FIG. 2 is a network system, according to an exemplary embodiment of the present disclosure.

FIG. 2 is a network system, according to an exemplary embodiment of the present disclosure. In this embodiment, a network system 200 includes a controller 210, at least one gateway 220 and at least one access point 230. The at least one access point 230 may also be disposed on a car of a train for serving the UEs of this car. The at least one gateway 220 may be electrically connected to the access point 230, and the access point 230 may route data flow from at least one user equipment 260_1~260_N (N is a positive integer) to a network 240. In one embodiment, when the data from the user equipment is authentication information, the at least one gateway 220 may facilitate the at least one access point 230 to route the authentication information to the authentication server 250 (for example, an AAA server).

Unlike the well-known art as shown in FIG. 1, the network system 200 in FIG. 2 includes a controller electrically connected or wireless connection to the at least one gateway 220 and the controller 210. In an embodiment, the controller 210 may be a software-defined networking (SDN) controller, which may include a storage unit 212, and a processing unit 214. Storage unit 212 may be, but not limited to a memory, a hard disk, or any other element that may be used to store data and/or record multiple codes or modules. Processing unit 214 is electrically connected to the storage unit 212. Processing unit 214 may be a general purpose processor, a special purpose processor, a conventional processor, a digital signal processor, a plurality of microprocessors, a microprocessor with one or more digital signal processors, controller, microcontrollers, application-specific integrated circuit (ASIC), field programmable gate array circuits (FPGAs), any other kind of integrated circuits, a state machine, based on Advanced RISC Set machine (ARM) processor and similar articles.

In an embodiment, the at least one access point 230 may have SDN switch features, and may communicate with the controller 210 by a SDN-based communication protocol (for example, OpenFlow) to exchange information. In other embodiments, the SDN switch may also be implemented as a separate switch on the device outside the at least one access point 230, to facilitate the access point 230 to communicate with the controller 210. In SDN, data plane and control plane are separated. FIG. 2 also depicts a transmission path for data flow and control flow separately.

In addition, although FIG. 2 illustrates only a single gateway 220 and a single access point 230 to illustrate the concepts of the present embodiment, but this is not construed as limiting the possible embodiments disclosed. In other embodiments, these technical features are equally applicable to the present disclosed network systems with multiple gateways and multiple access points.

In this embodiment, the processing unit 214 may access the storage unit 212 and executes a determining module 212_1, a control module 212_2, an estimating module 212_3, a calculating module 212_4 and a selecting module 212_5 and execute the method for post-authenticating at least one user equipment.

Figure 3:
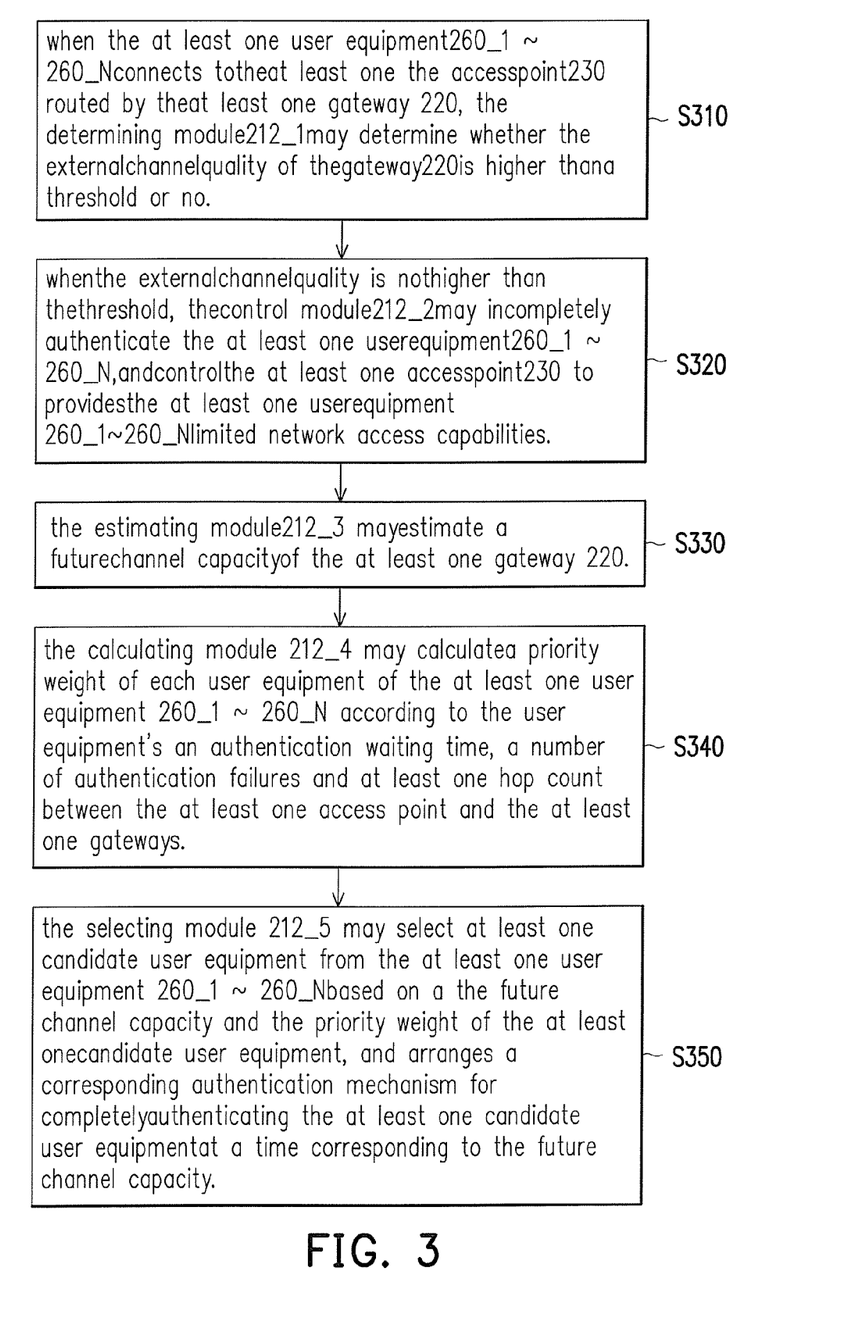
FIG. 3 illustrates the flow chart of a method for post-authenticating at least one user equipment, according to an exemplary embodiment of the present disclosure.

FIG. 3 illustrates a flow chart of a method for post-authenticating at least one user equipment, according to an exemplary embodiment of the present disclosure. The method in FIG. 3 may be executed by the controller 210 of FIG. 2. Combined with the elements shown in FIG. 2, the detailed of the exemplary embodiment of FIG. 3 will be explained in the following.

First, in step S310, when the at least one user equipment 260_1~260_N connects to the at least one the access point 230 routed by the at least one gateway 220, the determining module 212_1 may determine whether the external channel quality of the gateway 220 is higher than a threshold or not. The external channel quality, for example, may be a channel quality (such as SNR) between at least one gateway 220 and the network 240, and the threshold may be an arbitrary value selected by the designer (e.g. 20 dB). This threshold may be preset, randomly selected, or transmitted via the network. In an embodiment, when the at least one user equipment 260_1~260_N connects to the at least one access point 230, the at least one access point 230 may send the user information (such as a media access control (MAC) address and international mobile subscriber identity (IMSI), etc.) to the controller 210 through OpenFlow, but is not limited thereto.

In an embodiment, the designer may also determine the threshold based on the channel quality corresponding to a channel capacity. For example, designers may find out a channel capacity for sufficiently transmitting at least one authentication data, and determine the channel quality corresponding to the channel capacity as a threshold. In this case, when the external channel quality is higher than the threshold, it represents that the channel capacity corresponding to the external channel quality is sufficient to transmit at least one authentication data. Assume that the channel capacity corresponding to the external channel quality is sufficient to transfer two authentication information, the controller 210 may arrange directly two of user equipments 260_1~260_N (in the case, N≥2) to authenticate with the authentication server 250. On the other hand, when the external channel quality is not higher than the threshold, it may represent that the channel capacity corresponding to the external channel quality is insufficient to transmit any authentication information.

Thus, in step S320, when the external channel quality is not higher than the threshold, the control module 212_2 may incompletely authenticate the at least one user equipment 260_1~260_N, and control the at least one access point 230 to provides the at least one user equipment 260_1~260_N limited network access capabilities. In other words, the control module 212_2 may allow unauthenticated or only partially authenticated user equipment 260_1~260_N to connect the network 240 with the limited network access abilities to the Internet via the at least one access point 230. Take user equipment 260_1 as an exemplar, unauthenticated or only partially authenticated user equipment 260_1 may connect the network 240 with limited abilities (such as limited bandwidth, limited throughput or limited time (e.g. 20 minutes), but is not limited thereto) to the Internet via access point 230 through the control module 212_2. Thus, the disclosed method not only satisfies the demands of the user equipment 260_1 to access the Internet, but also avoids the user equipment 260_1 to continuously try to send authentication information under the condition of a poor external channels quality. In other words, the embodiments of the present disclosure may reduce the probability of occurring network congestion on the at least one gateway 220, and also improve the Internet time for the unauthenticated or partially authenticated users.

Next, the method may select at least one candidate user equipment having a higher priority weight to be authenticated from the at least one user equipment 260_1~260_N through steps S330~S350, and completely authenticate the at least one candidate user equipment at a proper time.

In step S330, the estimating module 212_3 may estimate a future channel capacity of the at least one gateway 220. In an embodiment, the channel quality estimation model of the at least one gateway 220 may be built by the estimating module 212_3 based on the at least one gateway 220 and a car individual history information. The car individual history information includes, for example, a traveling route of a car or a train and traveling speeds of various sections on this traveling route. The history information for the at least one gateway 220 includes, for example, the channel quality of the at least one gateway 220 previously measured on the traveling route of the car or the train.

From the aforementioned, it may be seen that the estimating module 212_3 may be used to estimate the future channel quality of the at least one gateway 220 on each section on the traveling route of the car or the train. Subsequently, estimating module 212_3 may establish a mapping table of channel quality relative to section on the traveling route according to the measured results (that is, the channel quality estimation model of the at least one gateway 220). Because the traveling route of the car or the train and the location of the surrounding station are fixed, therefore, the mapping table is quite reliable. For other configurations of the gateway relative to the car or the train (not shown), the estimating module 212_3 may establish the channel quality estimation model on the basis of the foregoing teachings.

After the channel quality estimation model of the at least one gateway 220 has been established, the estimating module 212_3 may get current moving information of the train and use the current moving information to estimate the future moving information of the train. The current moving information may include, but not limited to the information of the current traveling section and the traveling speed of the train obtained from the satellite positioning system (global positioning system, GPS). The future moving information of the train may include, but not limited to the information of the future traveling section and future traveling speed of the train. The traveling route and the traveling speed of the train are generally predefined parameters, therefore, the estimating module 212_3 may easily get the future traveling route of the train and the future traveling speed of the train after the current moving information is obtained.

Then, the estimating module 212_3 may estimate the future channel quality of the at least one gateway 220 according to the future moving information and the channel quality estimation model. For example, the estimating module 212_3 may look up the mapping table according to the future traveling section and the future traveling speed, and get the channel quality (i.e., future channel quality) relative to the traveling section. Thereafter, the estimating module 212_3 may get the future channel capacity according to the future channel quality of the at least one gateway 220. In an embodiment, assumed that the signal noise ratio at a time i (i is a positive integer) is denoted as SNRi. The future channel capacity estimated by the estimating module 212_3 at the time i may be characterized as:

$$C(i)=B \times \log_2+(1+SNR_i) \qquad (1)$$

Wherein B is a frequency range of the at least one gateway 220.

The difference of the authentication information size under a same authentication mechanism is small. Therefore, after the future channel capacity (i.e., C(i)) at the time i is calculated, the estimating module 211_3 may calculate the quotient of C(i) divided by the authentication information size (hereinafter referred to j), to get the number of the authenticate information that the at least one gateways 220 may transmit at time i. Namely, j is a number of user equipments trying to complete the authentication at the time i, and which is allowed by the at least one gateway 220. Assume that j is 4, it means that the at least one gateway 220 allows four of the user equipments 260_1~260_Ns (in the case, N≥4) to respectively transmit its own authentication information to the authentication server 250 at time i.

In step S340, the calculating module 2124 may calculate a priority weight of each user equipment of the at least one user equipment 260_1~260_N according to the user equipment's an authentication waiting time, a number of authentication failures and at least one hop count between the at least one access point and the at least one gateways.

In an embodiment, an n-th (1≤n≤N) priority weight of the n-th user equipment 260_ n-may be characterized as:

$$P(n)=w_1 \times WT+(1-w_2^h)+(1-w_3 \times FT) \qquad (2)$$

Wherein $w_1$ to $w_3$ are weight values, WT is the authentication waiting time of the n-th user equipment, h is the at least one hop count between the at least one access point and the at least one gateway serving for the n-th user equipment, FT is the number of the authentication failures for the n-th user equipment. $w_1$ To $w_3$ may be, but not limited to any value (including zero) selected by the designers based on their demands, which may be pre-set, set randomly or transmitted via the Internet. WT may be, but not limited to the time for the n-th user equipment to access network 240 with limited network access abilities. h may be, but not limited to the number of devices having been passed while the access point 230 transmits data to the at least one gateway 220. Assume that the at least one access point 230 is connected directly to the at least one gateway 220, then h is 1. Assume that the at least one access point 230 is connected through two devices (for example, two other access points) to the at least one gateway 220, then the h is 3. FT is a number of authentication failures such as the n-th user equipment attempting to send the authentication information but failing to be authenticated completely.

In other embodiments, the n-th (n is an integer of between 1~N) priority weight of the user equipment 260_n may be, but not limited to characterized as the demands of the designers, such as the following equations (3) to (9).

$$P(n)=w_1 \times WT+w_2 \times h+(1-w_3 \times FT) \qquad (3)$$

$$P(n)=w_1 \times WT \qquad (4)$$

$$P(n)=w_2 \times h \qquad (5)$$

$$P(n)=(1-w_3 \times FT) \qquad (6)$$

$$P(n)=w_1 \times WT+w_2 \times h \qquad (7)$$

$$P(n)=w_1 \times WT+(1-w_3 \times FT) \qquad (8)$$

$$P(n)=w_2 \times h+(1-w_3 \times FT) \qquad (9)$$

In step S350, the selecting module 212_5 may select at least one candidate user equipment from the at least one user equipment 260_1~260_N based on the future channel capacity and the priority weight of the at least one candidate user equipment, and arranges a corresponding authentication mechanism for completely authenticating the at least one candidate user equipment at a time corresponding to the future channel capacity.

In an embodiment, the selecting module 212_5 may sort the at least one user equipment 260_1~260_N in a descending order according to the priority weight of each user equipment, and calculate a specific number based on the future channel capacity (i.e., C(i)) and an authentication information size (hereinafter referred to j), wherein the specific number may be, but not limited to the future channel capacity divided by the authentication information size; C(i) Next, the selecting module 212_5 may select a specific number of preceding user equipments being sorted from the at least one user equipment 260_1~260_N as at least one candidate user equipment. In other words, the selecting module 212_5 may select j user equipment(s) having a higher priority from the at least one user equipment 260_1~260_N as the at least one candidate user equipment. Next, the selecting module 212_5 may arrange an authentication mechanism for completely authenticating the at least one candidate user equipment at a time.

When the at least one candidate user equipment completes the authentication, the selecting module 212_5 may control the at least one access point 230 to provide unlimited network capabilities to the at least one candidate user equipment. In other words, the user equipment after completing the authentication may access network 240 with unlimited bandwidth, unlimited throughput, and without a time limit.

Briefly, when the controller 210 determines that the external channel quality of the at least one gateway 220 is currently not good, the controller 210 may temporarily allow the at least one user equipment 260_1~260_N to use limited network access abilities to access the network. Then, when the controller 210 estimates the future channel quality at time i will be improved, the controller 210 may arrange authentication opportunities for the at least one candidate user equipment having a higher priority weight to send the authentication information to the authentication server 250 at a proper time.

Figure 4:
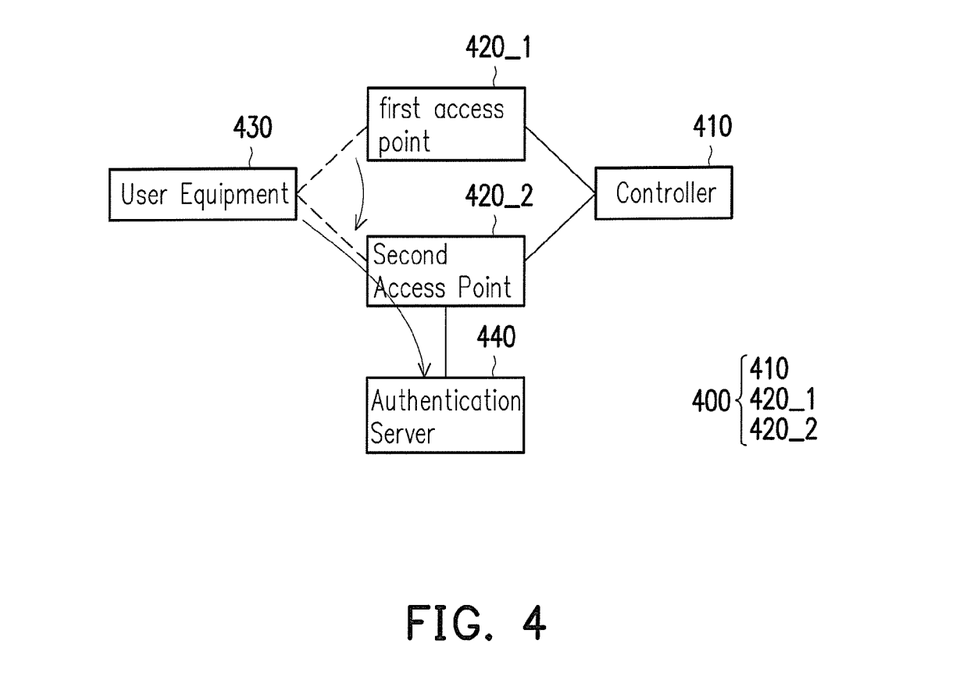
FIG. 4 is a network system, according to an embodiment of the present disclosure.
Figure 5:
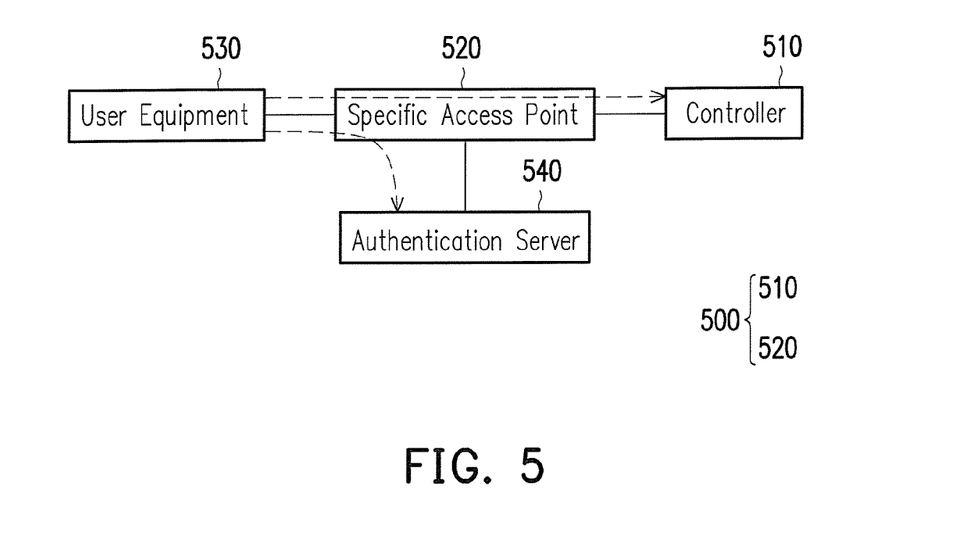
FIG. 5 is a network system, according to another embodiment of the present disclosure.

In other embodiments of the disclosure, the network system may be configured to control respectively the access point to provide the user equipment with the limited or unlimited network access ability, as shown in FIGS. 4-5. Referring to the embodiment in FIG. 4, a network system 400 includes a controller 410, a first access point 420_1, and a second access point 420_2 connected to an authentication server 440. For example, the first access point 420_1 is connected to an incompletely authenticated user equipment 430, and provides a limited access network ability to the user equipment 430. As previously mentioned, when the user equipment 430 connects to the first access point 420_1, the first access point 420_1t may transfer the user information of user equipment 430—to the controller 410 via OpenFlow. Then, according to the aforementioned teachings in arranging the authentication mechanism of the disclosure, the controller 410 may allow the user equipment 430 attempts to be authenticated at a time i. Also, the controller 410 may inform the user equipment 430 by using a control protocol to switch the connecting from the first access point 420_1 to the second access point 420_2 at the time i, so that the authentication server may completely authenticate the candidate user equipment 430 through the second port 420_2. The control protocol may be, but not limited to a network search and selection mechanism (access network discovery and selection function, ANDSF). After the authentication server 440 completely authenticates the user equipment 430, the controller 410 may control the second access point 420_2 to provide an unlimited network ability to the user equipment 430, to allow the user equipment 430 to access the network with such as unlimited bandwidth, unlimited throughput, and without a time limit.

In addition, the authentication server 440 may have a different scheme to authenticate the user equipment 430 according to the type of the user equipment 430. For example, when the user equipment 430 is a device running under a global system for mobiles, (GSM), the authentication server 440 may base on the subscriber identification module (SIM) extensible authentication Agreement (EAP) (i.e., EAP-SIM) to authenticate the user equipment 430. For another example, when the user equipment 430 is a device running under the standard universal mobile telecommunications system (UMTS), the authentication server 440 may base on the security authentication and key distribution (Authentication and Key Agreement for, AKA) of EAP (i.e., EAP-AKA) to authenticate the user equipment 430.

In other embodiments of the disclosure, the network system may also be configured to control a specific access point to provide the user equipment with the limited or unlimited network access ability concurrently. Refer to the embodiment in FIG. 5, a network system 500 includes a controller 510 and an authentication server 540 connected to a specific access point 520. The specific access point 520 may further include a first port and a second port (not shown). The first port may be a default port that may provide a limited network ability to an incompletely authenticated user equipment 530. As previously mentioned, when the user equipment 530 connects to the first port, the specific access point 520 may transfers the user information of user equipment 530 to the controller 510 via the OpenFlow. Then, according to the aforementioned teachings in arranging the authentication mechanism of the disclosure, the controller 510 may allow the user equipment 530 attempts to be authenticated at a time i. Also, the controller 510 may inform the user equipment 530 via OpenFlow to switch the connecting from the first port to the second port at the time i, so that the authentication server 540 may completely authenticate the candidate user equipment 530 through the second port. After the authentication server 540 completely authenticates the user equipment 530, the controller 510 may control the specific access point 520 to provide an unlimited network ability to the user equipment 530, to allow the user equipment 530 to access the network with such as unlimited bandwidth, unlimited throughput, and without a time limit.

In an embodiment, the first port may be characterized as a service set identifier (SSID) without password, and the second port may be characterized as a service set identifier (SSID) with password. In this case, the unauthenticated user equipment 530 will connect to a SSID corresponding to the first port. When the specific access point 520 informs the user equipment 530 to switch the connecting to the second port, the specific access point 520 may also informs the user equipment 530 of the password of the second port, to allow the user equipment 530 to switch the connecting to the SSID of the second port. In other embodiments, the second port may be implemented as a hidden SSID with password. That is, the unauthenticated user equipment 530 fails to find the information of the second port from a list of SSID of the first port, but the disclosed embodiments are not limited thereto.

In summary, the present disclosure provides a method for post-authenticating at least one user equipment, a controller and a network systems thereof. When the controller determines that the external channel quality of the at least one gateway is currently not good, the controller may temporarily allow the at least one unauthenticated or partially authenticated user equipment to use limited network access abilities to access the network. Then, when the controller estimates the future channel quality will be improved at a time, the controller may arrange authentication opportunities for the at least one candidate user equipment having a higher priority to send the authentication information to the authentication server at the time. Therefore, the embodiments of the present disclosure reduce the probability of occurring network congestion on the at least one gateway, and also improve the Internet time for the unauthenticated or partially authenticated users.

It will be apparent to those skilled in the art that various modifications and variations can be made to the disclosed embodiments. It is intended that the specification and examples be considered as exemplary embodiments only, with a scope of the disclosure being indicated by the following claims and their equivalents.

What is claimed is:

1. A method for post-authenticating at least one user equipment, adapted to a controller connected to at least one gateway, comprising:
the at least one user equipment is connected to at least an access point, determining whether an external channel quality of the at least one gateway is higher than a threshold;
incompletely authenticating the at least one user equipment, and controlling the at least one access point to provide the at least one user equipment with a limited network access ability, wherein the external channel quality is not higher than the threshold;
estimating a future channel capacity of the at least one gateway;
calculating a priority weight of each user equipment of the at least one user equipment according to the user equipment's an authentication waiting time, a number of authentication failures and at least one hop count between the at least one access point and the at least one gateway; and
selecting at least one candidate user equipment from the at least one user equipment based on the future channel capacity and the priority weight of the at least one candidate user equipment, and arranging a corresponding authentication mechanism for completely authenticating the at least one candidate user equipment at a time corresponding to the future channel capacity.

2. The method for post-authenticating the at least one user equipment of claim 1, wherein
the controller is a software-defined networking controller, and the controller, the at least one access point and the at least one gateway are configured on a train having a plurality of cars and a predictable traveling route.

3. The method for post-authenticating the at least one user equipment of claim 1, wherein estimating the future channel capacity of the at least one gateway further includes:
establishing a channel quality estimation model based on the at least one gateway and a car individual history information;
getting a current moving information of a car and estimating a future moving information of the car based on the current moving information;
estimating a future channel quality of the at least one gateway according to the future moving information and the channel quality estimation model; and
estimating the future channel capacity of the at least one gateway according to the future channel quality.

4. The method for post-authenticating the at least one user equipment of claim 1, wherein the future channel capacity at time i is:

$$C(i)=B \times \log_2(1+SNR_i)$$

wherein B is a frequency range of the at least one gateway, and SNRi is a signal to noise ratio at time i.

5. The method for post-authenticating the at least one user equipment of claim 1, wherein the priority weight of an n-th user equipment of the at least one user equipment is characterized by:

$$P(n)=w_1 \times WT+(1-w_2{}^h)+(1-w_3 \times FT)$$

wherein $w_1$ to $w_3$ are weight values, WT is the authentication waiting time of the n-th user equipment, h is the at least one hop count between the at least one access point and the at least one gateway serving for the n-th user equipment, FT is the number of the authentication failures for the n-th user equipment.

6. The method for post-authenticating the at least one user equipment of claim 1, wherein selecting the at least one candidate user equipment from the at least one user equipment based on the future channel capacity and the priority weight of the at least one candidate user equipment further includes:
sorting the at least one user equipment in a descending order according to the priority weight of the each user equipment;
calculating a specific number based on the future channel capacity and an authentication information size, wherein the specific number is the future channel capacity divided by the authentication information size; and
selecting the specific number of at least one user equipment having a higher priority weight as that of the at least one candidate user equipment.

7. The method for post-authenticating the at least one user equipment of claim 1, wherein the at least access point further includes a first port connecting to the at least one user equipment incompletely authenticated, and the first port provides the limited network access ability to the at least one user equipment incompletely authenticated.

8. The method for post-authenticating the at least one user equipment of claim 7, wherein the at least one access point further includes a second port connected to an authentication server, and arranging the corresponding authentication mechanism for completely authenticating the at least one candidate user equipment at the time corresponding to the future channel capacity further includes:
switching the connecting from the first port to the second port at the time i by a control protocol, and the authentication server completely authenticates the at least one candidate user equipment through the second port.

9. The method for post-authenticating the at least one user equipment of claim 1, wherein the at least one access point includes a specific access point having a first port, and the first port provides the limited network access ability to the at least one user equipment which is incompletely authenticated and connected to the first port.

10. The method for post-authenticating the at least one user equipment of claim 9, wherein the specific access point further includes a second port connected to an authentication server, and arranging the corresponding authentication mechanism for completely authenticating the at least one candidate user equipment at the time corresponding to the future channel capacity further includes:
switching the connecting from the first port to the second port at the time, and the authentication server completely authenticates the at least one candidate user equipment through the second port.

11. The method for post-authenticating the at least one user equipment of claim 1, wherein arranging the corresponding authentication mechanism for completely authenticating the at least one candidate user equipment further includes:
wherein authenticating the at least one candidate user equipment is finished, and the at least one access point provides an unlimited network access capability to the at least one candidate user equipment.

12. A controller, comprising:
a storage unit, storing multiple modules; and
a processing unit, connected to the storage unit, accessing and executing the multiple modules, the multiple modules include:
a determining module, determining whether an external channel quality of at least one gateway is higher than a threshold, wherein at least one user equipment is connected to at least one access point through the at least one gateway;
a controlling module, incompletely authenticating the at least one user equipment, wherein the external channel quality is not higher than the threshold, and controlling the at least one access point to provide the at least one user equipment with a limited network access ability;
an estimating module, estimating a future channel capacity of the at least one gateway;
a calculating module, calculating a priority weight of each user equipment of the at least one user equipment according to the user equipment's an authentication waiting time, a number of authentication failures and at least one hop count between the at least one access point and at least one gateway; and
a selecting module, selecting at least one candidate user equipment from the at least one user equipment based on the future channel capacity and the priority weight of the at least one candidate user equipment, and arranging a corresponding authentication mechanism for completely authenticating the at least one candidate user equipment at a time corresponding to the future channel capacity.

13. The controller of claim 12, wherein the controller is a software-defined networking controller, and the controller, the at least one access point and the at least one gateway are configured on a train having a plurality of cars and a predictable traveling route.

14. The controller of claim 12, wherein the estimating module further includes:
to establish a channel quality estimation model based on the at least one gateway and a car individual history information;
to get a current moving information of a car and estimating a future moving information of the car based on the current moving information;
to estimate a future channel quality of the at least one gateway according to the future moving information and the channel quality estimation model; and
to estimate the future channel capacity of the at least one gateway according to the future channel quality.

15. The controller of claim 12, wherein the future channel capacity at time i is:

$$C(i)=B\times\log_2(1+SNR_i)$$

wherein B is a frequency range of the at least one gateway, and SNRi is a signal to noise ratio at time i.

16. The controller of claim 12, wherein the priority weight of an n-th user equipment of the at least one user equipment is characterized by:

$$P(n)=w_1\times WT+(1-w_2^h)+(1-w_3\times FT)$$

wherein $w_1$ to $w_3$ are weight values, WT is the authentication waiting time of the n-th user equipment, h is the at least one hop count between the at least one access point and the at least one gateway serving for the n-th user equipment, FT is the number of the authentication failures for the n-th user equipment.

17. The controller of claim 12, wherein the controller module further includes:
to sort the at least one user equipment in a descending order according to the priority weight of the each user equipment;
to calculate a specific number based on the future channel capacity and an authentication information size, wherein the specific number is the future channel capacity divided by the authentication information size; and
to select the specific number of at least one user equipment having a higher priority weight as that of the at least one candidate user equipment.

18. The controller of claim 12, wherein the at least access point further includes a first port connecting the at least one user equipment incompletely authenticated, and the first port provides the limited network access ability to the at least one user equipment incompletely authenticated.

19. The controller of claim 18, wherein the at least one access point further includes a second port connected to an authentication server, and the selecting module is configured to:
switch the connecting from the first port to the second port at the time by a control protocol, and the authentication server completely authenticates the at least one candidate user equipment through the second port.

20. The controller of claim 12, wherein the at least one access point includes a specific access point having a first port, and the first port provides the limited network access ability to the at least one user equipment incompletely authenticated and connecting the first port.

21. The controller of claim 20, wherein the specific access point further include a second port connected to an authentication server, and the selecting module is configured to:
switch the connecting from the first port to the second port at the time, and the authentication server authenticates the at least one candidate user equipment completely through the second port.

22. The controller of claim 12, wherein the selecting module is further configured to:
provide, by the at least one access point, an unlimited network access capability to the at least one candidate user equipment, wherein authenticating the at least one candidate user equipment is finished.

23. A network system, comprising:
at least one gateway;
at least one access point, connected to the at least one gateway to access a network; and
a controller, connected to the at least one gateway and the at least one access point, wherein at least one user equipment is connected to the at least one access point through the at least one gateway, and the controller further including:
to determine whether an external channel quality of the at least one gateway is higher than a threshold;
to incompletely authenticate the at least one user equipment, and control the at least one access point to provide the at least one user equipment with a limited network access ability, wherein the external channel quality is not higher than the threshold;
to estimate a future channel capacity of the at least one gateway;
to calculate a priority weight of each user equipment of the at least one user equipment according to the user equipment's an authentication waiting time, a number of authentication failures and at least one hop count between the at least one access point and at least one gateway; and
to select at least one candidate user equipment from the at least one user equipment based on the future channel capacity and the priority weight of the at least one candidate user equipment, and to arrange a corresponding authentication mechanism for completely authenticating the at least one candidate user equipment at a time corresponding to the future channel capacity.

24. The network system of claim 23, wherein the controller is a software-defined networking controller, and the controller, the at least one access point and the at least one gateway are configured on a train having a plurality of cars and a predictable traveling route.

25. The network system of claim 23, wherein the controller includes:
to establish a channel quality estimation model based on the at least one gateway and a car individual history information;
to get a current moving information of a car and estimating a future moving information of the car based on the current moving information;
to estimate to estimate a future channel quality of the at least one gateway according to the future moving information and the channel quality estimation model; and
to estimate the future channel capacity of the at least one gateway according to the future channel quality.

26. The network system of claim 23, wherein the future channel capacity at time i is:

$$C(i) = B \times \log_2(1 + SNR_i)$$

wherein B is a frequency range of the at least one gateway, and SNRi is a signal to noise ratio at time i.

27. The network system of claim 23, wherein the priority weight of an n-th user equipment of the at least one user equipment is characterized by:

$$P(n) = w_1 \times WT + (1 - w_2^h) + (1 - w_3 \times FT)$$

wherein $w_1$ to $w_3$ are weight values, WT is the authentication waiting time of the n-th user equipment, h is the at least one hop count between the at least one access point and the at least one gateway serving for the n-th user equipment, FT is the number of the authentication failures for the n-th user equipment.

28. The network system of claim 23, wherein the controller further includes:
   to sort the at least one user equipment in a descending order according to the priority weight of the each user equipment;
   to calculate a specific number based on the future channel capacity and an authentication information size, wherein the specific number is the future channel capacity divided by the authentication information size; and
   to select the specific number of at least one user equipment having a higher priority weight as that of the at least one candidate user equipment.

29. The network system of claim 23, wherein the at least access point further includes a first port connecting the at least one user equipment incompletely authenticated, and the first port provides the limited network access ability to the at least one user equipment incompletely authenticated.

30. The network system of claim 29, wherein the at least one access point further includes a second port connected to an authentication server, and the controller is configured to:
   switch the connecting from the first port to the second port at the time by a control protocol, and the authentication server completely authenticates the at least one candidate user equipment through the second port.

31. The network system of claim 23, wherein the at least one access point includes a specific access point having a first port, and the first port provides the limited network access ability to the at least one user equipment incompletely authenticated and connecting the first port.

32. The network system of claim 31, wherein the specific access point further include a second port connected to an authentication server, and the controller is configured to:
   switch the connecting from the first port to the second port at the time, wherein the authentication server completely authenticates the at least one candidate user equipment through the second port.

33. The network system of claim 23, wherein the controller is configured to:
   provide, by the at least one access points, an unlimited network access capability to the at least one candidate user equipment, wherein authenticating the at least one candidate user equipment is finished.

* * * * *